Figure 1:
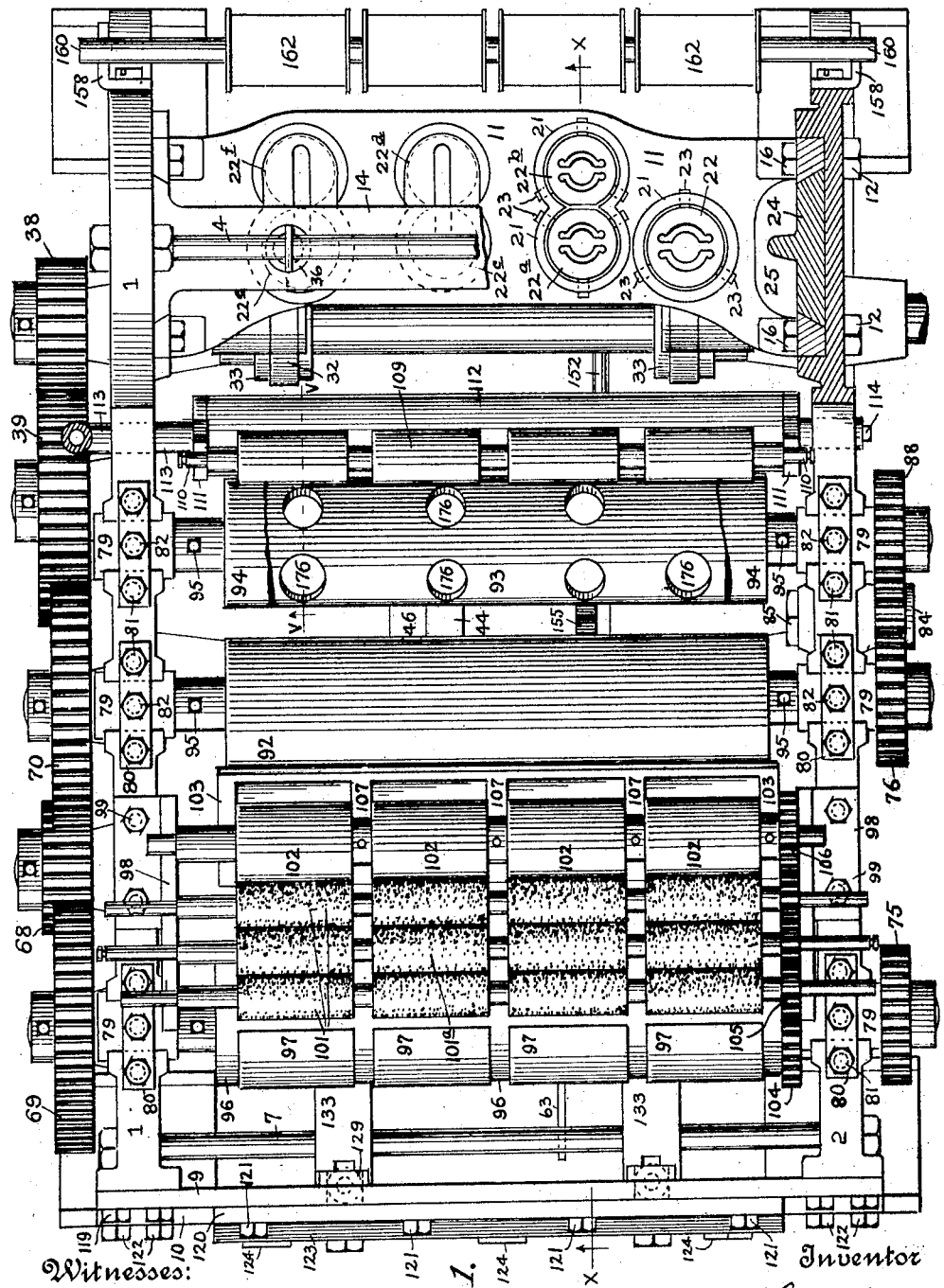

H. H. STEELE.
MACHINE FOR MAKING COIN CARDS.
APPLICATION FILED JULY 29, 1915.

1,400,634. Patented Dec. 20, 1921.
9 SHEETS—SHEET 4.

WITNESSES:

INVENTOR.
Herbert H. Steele.

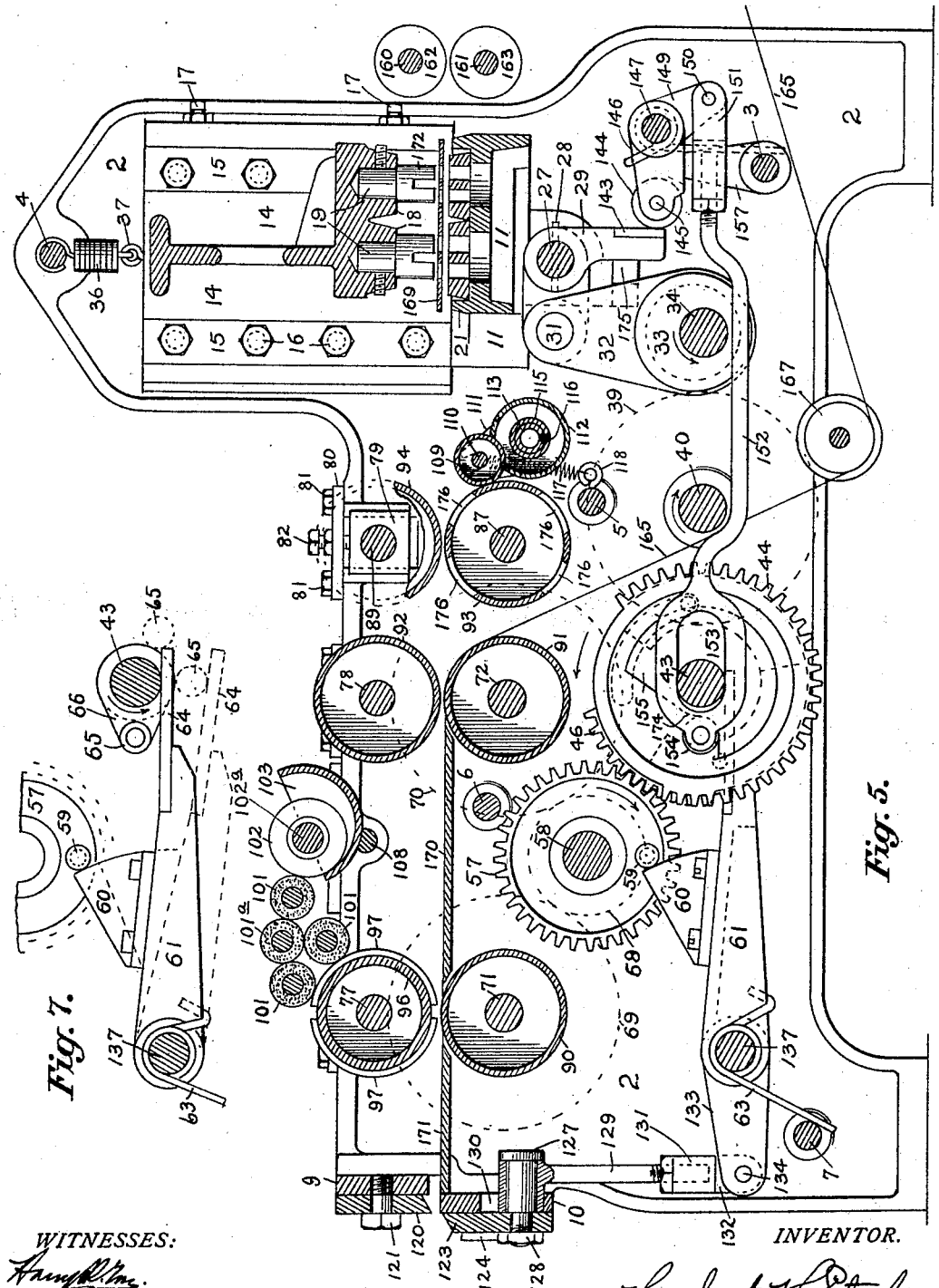

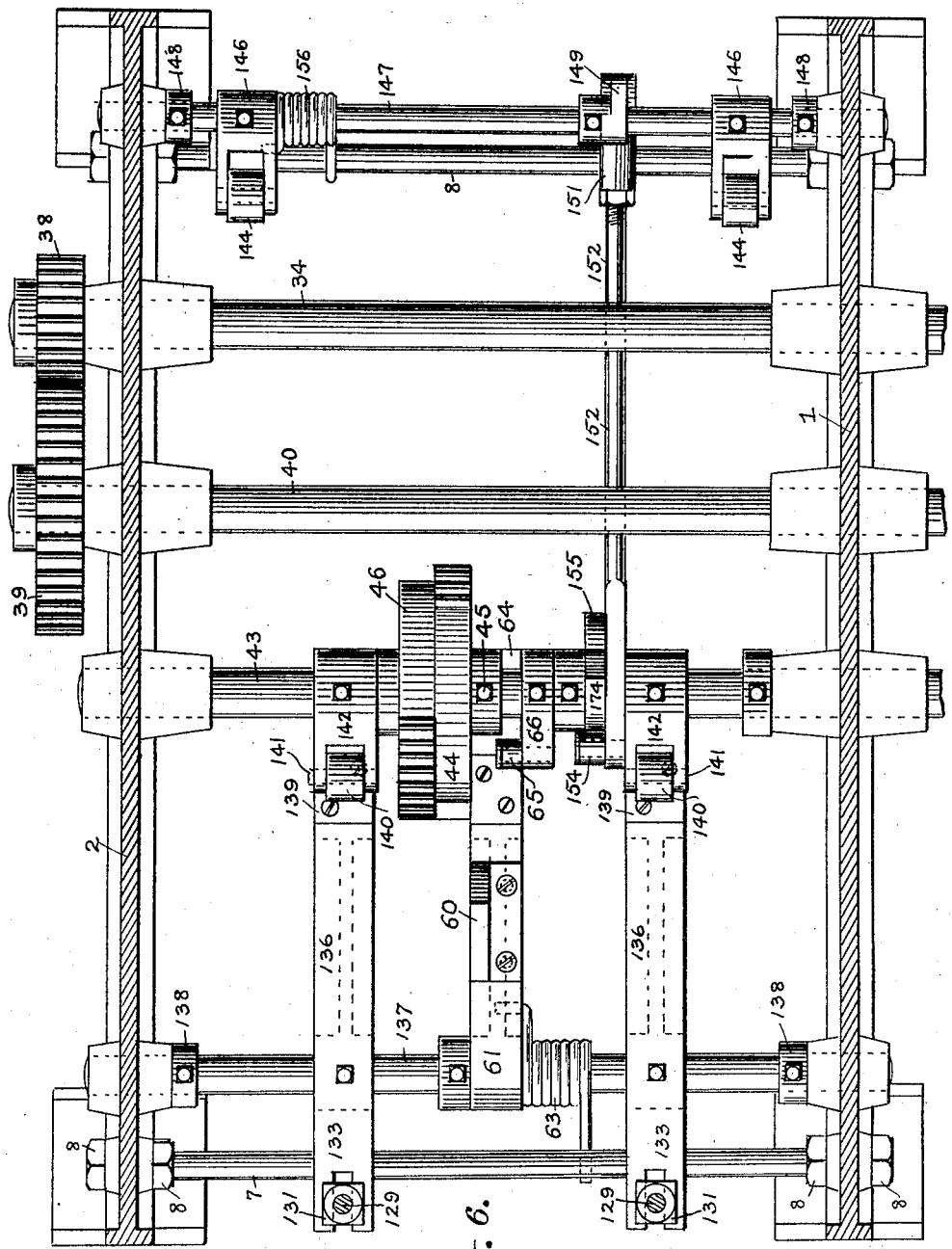

H. H. STEELE.
MACHINE FOR MAKING COIN CARDS.
APPLICATION FILED JULY 29, 1915.

1,400,634.

Patented Dec. 20, 1921.
9 SHEETS—SHEET 7.

Witnesses:
Harry R. Fox
F. E. Steele.

Inventor
Herbert H. Steele.

H. H. STEELE.
MACHINE FOR MAKING COIN CARDS.
APPLICATION FILED JULY 29, 1915.

1,400,634.

Patented Dec. 20, 1921.
9 SHEETS—SHEET 9.

Witnesses:

Inventor
Hubert H. Steele.

UNITED STATES PATENT OFFICE.

HERBERT H. STEELE, OF BROOKLYN, NEW YORK, ASSIGNOR, BY MESNE ASSIGNMENTS, TO JOHN H. EGGERS COMPANY, INC., OF NEW YORK, N. Y., A CORPORATION OF NEW YORK.

MACHINE FOR MAKING COIN-CARDS.

1,400,634.

Specification of Letters Patent.  Patented Dec. 20, 1921.

Application filed July 29, 1915. Serial No. 42,583.

*To all whom it may concern:*

Be it known that I, HERBERT H. STEELE, a citizen of the United States, residing at Brooklyn, in the county of Kings and State of New York, have invented a new and useful Machine for Making Coin-Cards, of which the following is a specification.

My invention relates to that class of machines in which continuous webs, bands or ribbons of paper are fed through the machine, to receive punching-out, gluing, joining together, printing and shearing operations; all combined to produce a finished coin-card product.

In the manufacture of coin-cards heretofore, flat cardboard stock in large sheets, has been employed. These commercial sheets are cut up into card-wide strips; these strips are then run through a punching press to form the pockets for the coin; strips of thin paper the same size as the cardboard are then pasted to the back of the latter; these two-part strips are then run through a cylinder press to receive the printed matter and finally cut up into finished card-lengths. From the first operation of cutting the cardboard sheets into card-wide strips to the finished product, constitutes a series of manual operations that add greatly to the cost of production.

The objects of the present machine are, first: to include the employment of continuous webs of materials that may be had at the paper mills in card-wide rolls containing several thousand feet of paper and thus eliminating all cutting waste associated with the commercial flat sheets. Second: to include punching-out mechanisms that form coin pockets in the web at intervals of one-card-length; third: to include self-supplying gluing elements to bind two webs together and which gluing device includes means to prevent the two webs being stuck together adjacent the coin-pocket position; fourth: to include printing elements that print such advertising matter as may be desired on each card-length section of the web; and fifth: to include shearing elements that sever the completed card from the web in uniform card-lengths. All these objects are realized through connected mechanisms that jointly indicate a single cycle of motion.

To the above and other ends the invention consists in the features of construction, combinations of devices and arrangements of parts hereinafter fully described and particularly pointed out in the claims.

Figure 2:
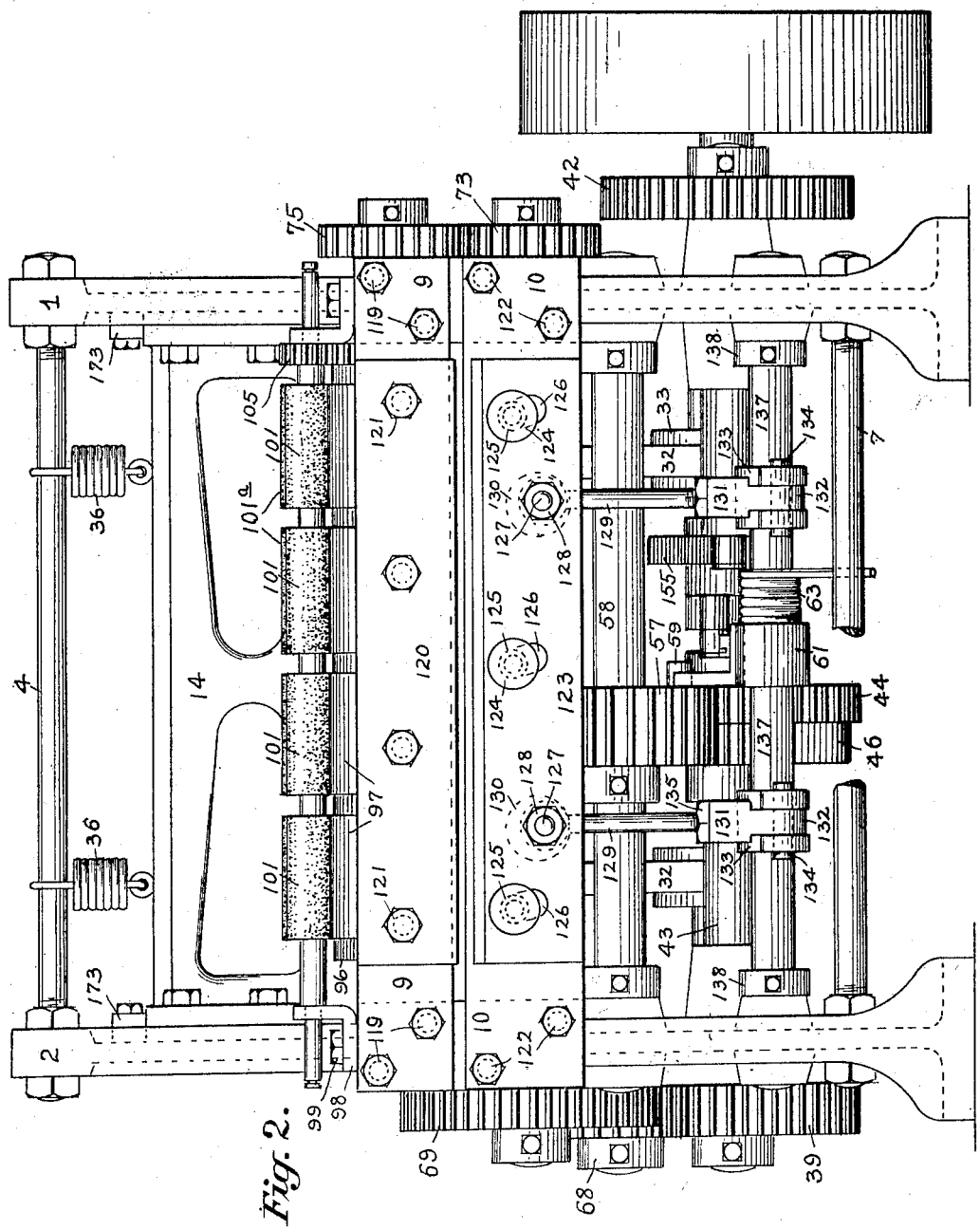
Figure 3:
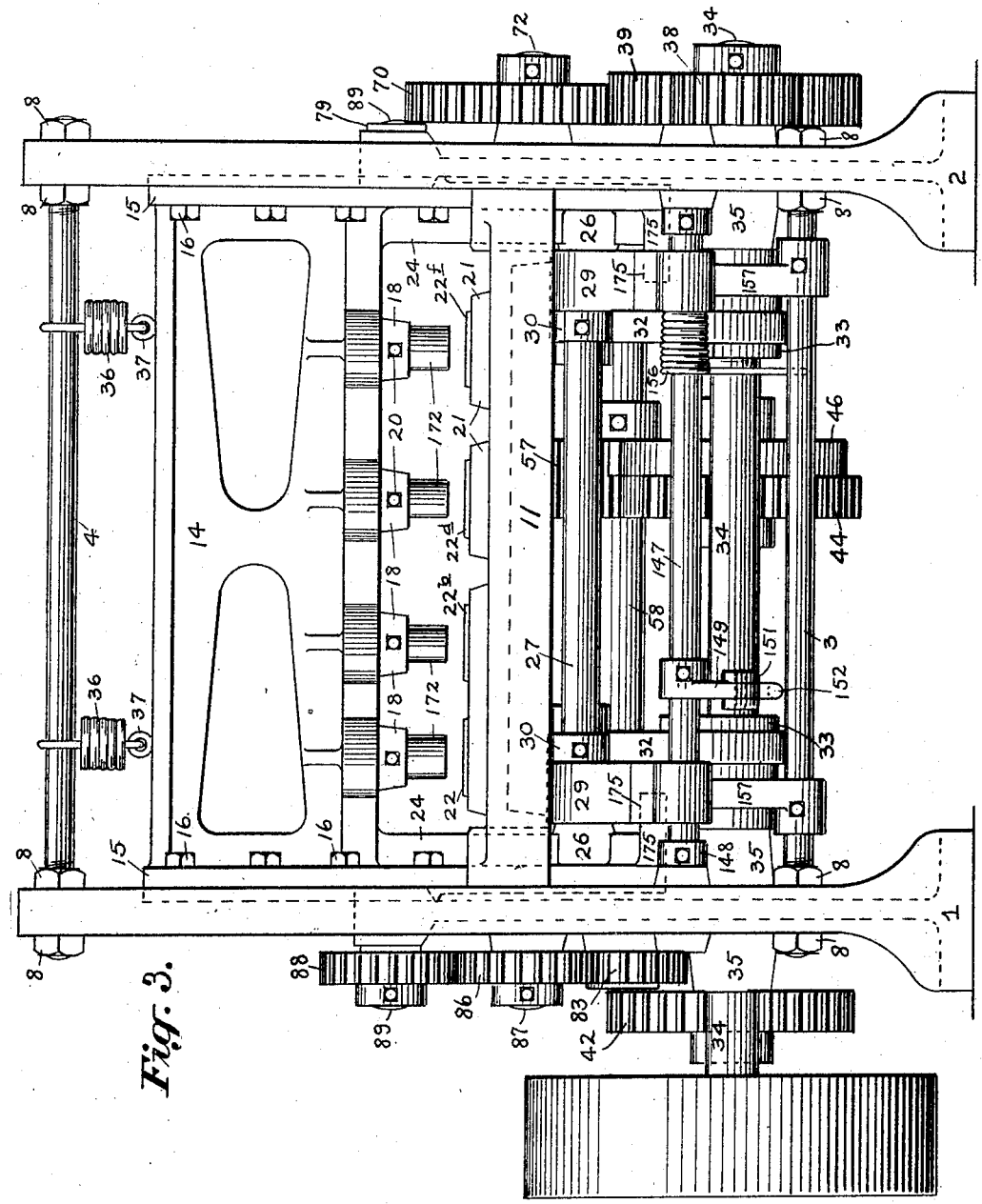
Figure 10:
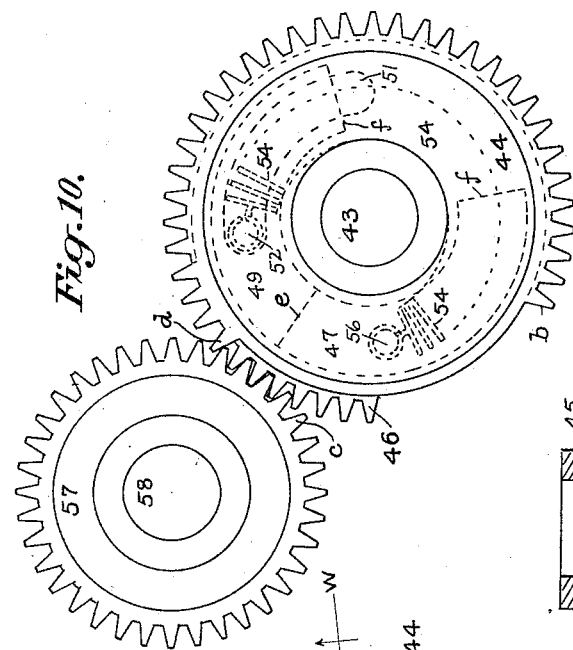
Figure 9:
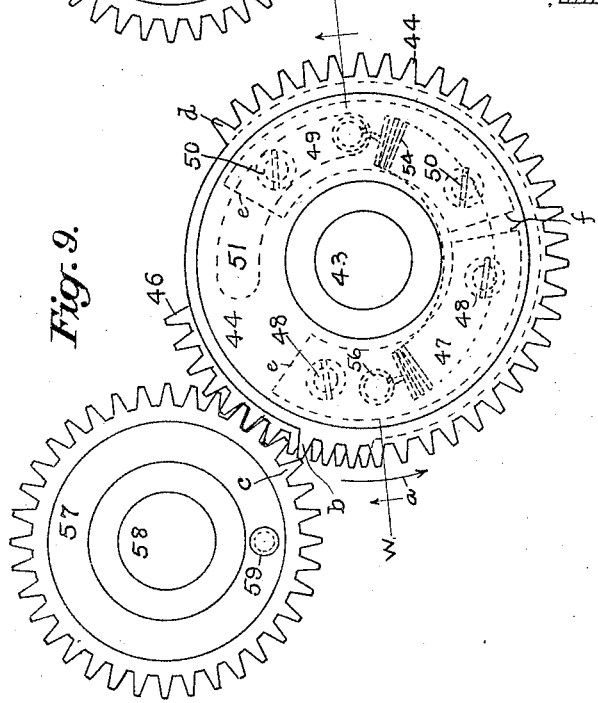
Figure 11:
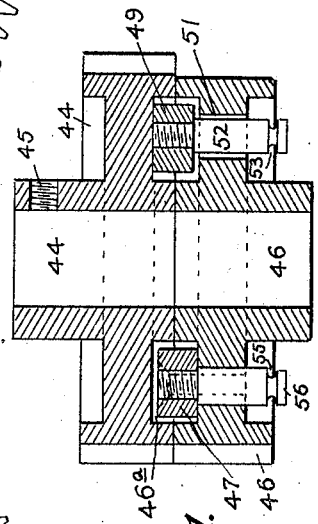
Figure 12:
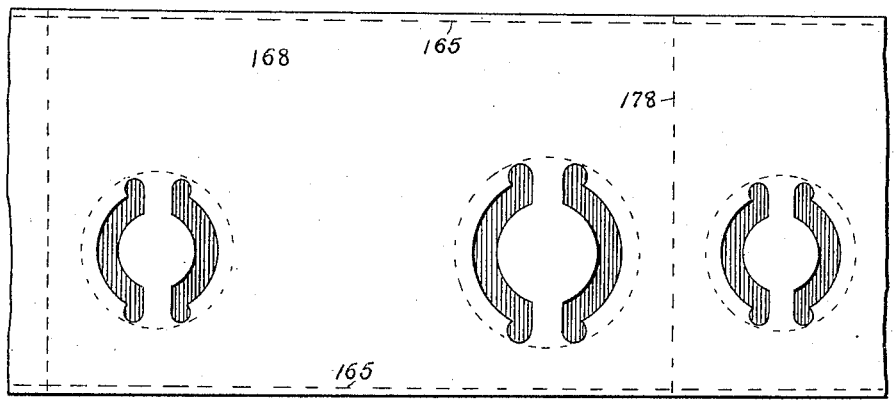
Figure 13:
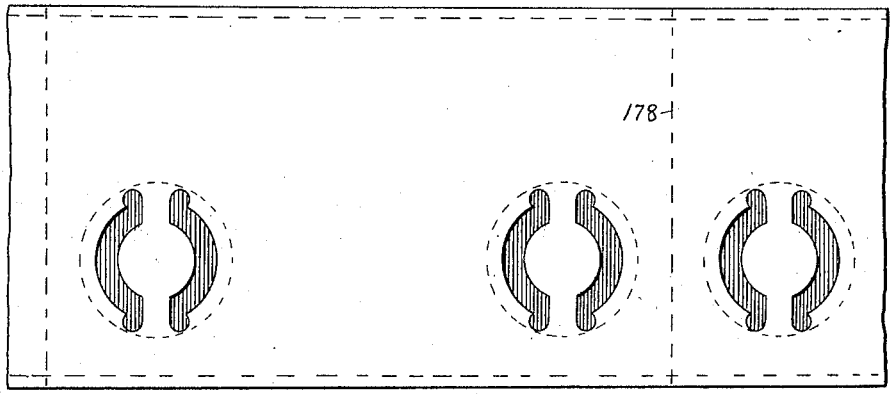
Figure 14:
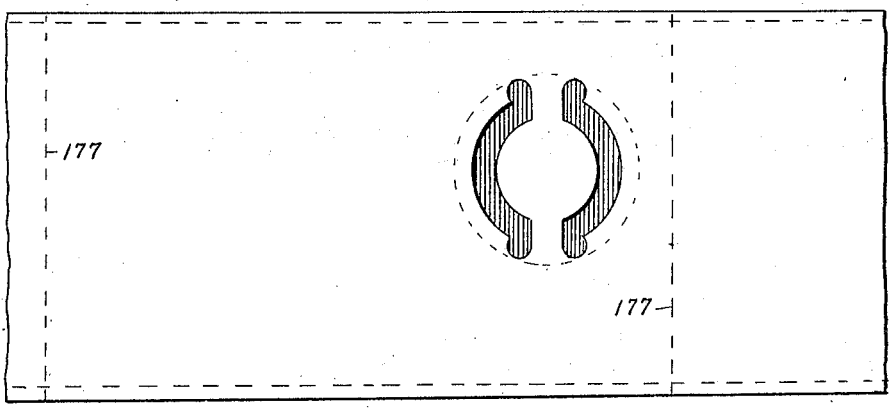
Figure 15:
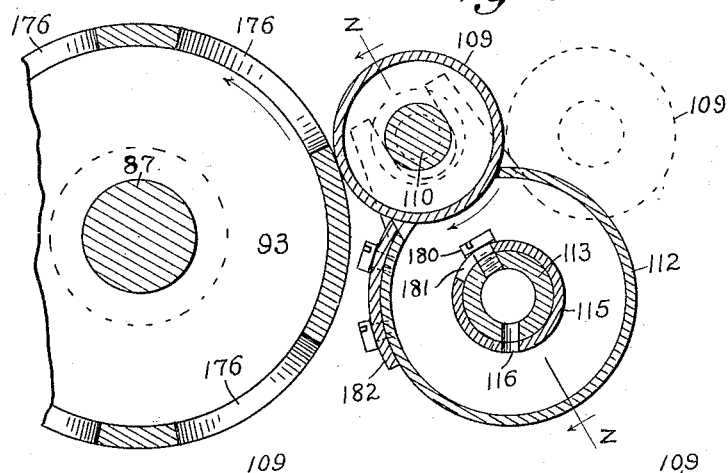
Figure 16:
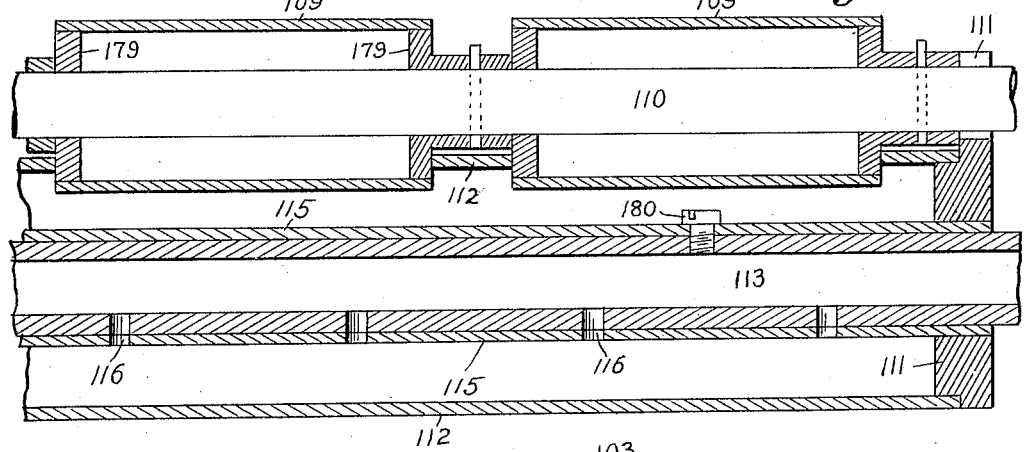
Figure 17:
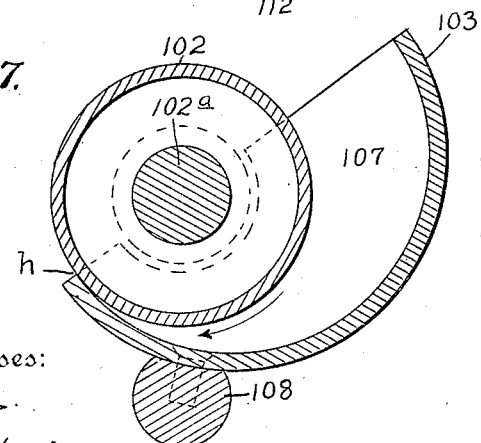
Figure 18:
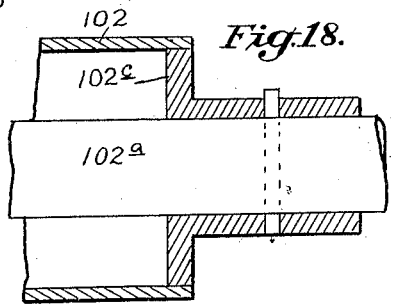

In the drawings, where similar parts are designated by the same numeral of reference in the several views, Figure 1, is a plan view of the machine with certain of the parts broken away. Fig. 2, is an end view of the machine facing the cutting off or shearing elements. Fig. 3, is an end elevation facing the punching-out elements and with the guiding rollers for the webs of paper removed for purposes of clearness. Fig. 4, is a side elevation of the machine. Fig. 5, is a longitudinal section through the machine indicated by the line $x$, $x$, looking in the direction of the arrows, Fig. 1. Fig. 6, is a horizontal section on a plane indicated by the line $y$, $y$, of Fig. 4. Fig. 7, a diagrammatic view illustrating the movement of one of the stop mechanisms associated with the paper feed. Fig. 8, a diagrammatic view of the eccentric connection to the punching-out mechanism. Fig. 9, and Fig. 10 are views illustrating the stop-motion associated with the paper feed during the interval the webs are being punched-out and the finished card severed from the web. Fig. 11, a sectional view of the stop-motion gears on a plane indicated by the line $w$, $w$, of Fig. 9. And Figs. 12, 13 and 14 are full-size views of the webs, illustrating the different combinations in which the coin-pockets may be arranged and their relative positions to the card-length dimension. Fig. 15, is an enlarged view of the glue distributing elements, taken through a plane indicated by the line $v$, $v$, Fig. 1. Fig. 16 a sectional view indicated by the line $z$, $z$, Fig. 15. Fig. 17, a cross-section through one of the ink distributing rolls and the associated ink trough. And Fig. 18, is a longitudinal sectional view of one end of an ink roller, showing detail construction.

1 and 2, indicate two cast iron side frames, that are secured together by tie-rods 3, 4, 5, 6 and 7. These rods are threaded at both ends and provided with two nuts 8; the side frames being clamped between the two nuts at each end of the rods. The frames are further tied together by two flat cross-bars 9 and 10 across the upper front ends of both frames and also by a die-bed or bolster 11, secured between the frames by cap-screws 12 and dowels 13.

14 is a slide, movable vertically within suitable gibs 15 that are removably secured to the side frames by cap screws 16 and rendered adjustable through the set screws 17. The slide is provided with seven bosses 18, each adapted to receive the shouldered down end of a punch 19 which punches are secured within the bosses by the set screws 20.

The bolster 11, is provided with seven bosses 21 that register with the positions of the bosses 18, and each is counterbored to receive a cutting-die 22. The dies are slightly smaller in diameter than the counterbored hole and the edges may be beveled as shown. Three set screws 23 are threaded through the walls of each boss and are adapted to bear against the beveled edge of the associated die.

The slide 14, at each end, is formed with downwardly extending arms 24 that pass through openings 25 in the bolster. The lower terminal of each arm 24 is provided with a hub 26 extending inwardly and is drilled to receive the ends of a rod 27 that secures the two arms together through pins 28 that pass through both hub and rod. 29 are two bellcranks that are loosely hung upon the rod 27 between the face of the hub and a collar 30 provided with a set screw. One arm of the bellcrank 29 is provided with a stud 31, upon which is hung a connection 32; the opposite end serves as a strap to an eccentric 33 secured to the main driving shaft 34 that has suitable bearings provided in the hubs 35 on each side of each side frame 1 and 2. The normal action of the eccentrics 33, is to vibrate their associated bellcranks 29 about the rod 27; the slide 14 being held suspended by springs 36 that are attached to eyebolts 37 in the upper edge of the slide and to the fixed tie-rod 4.

Motion from the main shaft 34 is transmitted through a pinion 38 at the end of the shaft, to a gear 39 at one end of a shaft 40. The opposite end of this shaft 40 is provided with a pinion 41, which in turn drives a gear 42 secured to the end of a shaft 43. Both shafts 40 and 43, are provided with suitable bearings in the side frames. The ratio of transmission from the shaft 34 to the shaft 43, is one to four; or in other words, the main driving shaft 34 will make four revolutions to each revolution for the shaft 43.

Referring to Figs. 5, 6, 9, 10 and 11, 44 indicates a gear that is secured to the shaft 43 by the set screw 45, about midway between the two sides frames. This gear 44 is mutilated, inasmuch as a certain number of the cogs or teeth are removed; or to be exact, this gear has thirty-three teeth, the other fifteen teeth of the original forty-eight teeth having been removed. To co-operate with this gear 44, a second gear 46 of the same diametral pitch, but having a greater mutilation inasmuch as only eleven teeth remain, is mounted loosely upon the shaft 43 at the side of the gear 44. Both these gears 44 and 46 are "web" gears, hence when arranged side by side, a circular hollow space is formed as indicated at 46ª. Within this space, are arranged two stop plates; one plate 47 being secured to the web of the gear 46 by screws 48 and the other plate 49 is secured to the web of the gear 44 by the screws 50. The disposition of these plates 47 and 49 is such that the loose gear 46 may have a circular movement about the shaft 43 through an arc of ninety degrees; movement beyond this dimension being checked by the end abutment of the two plates 47 and 49. The loose gear 46 has a circular slot 51 through its web adapted to give clearance to a post 52 that is secured to the gear 44 and passing through this groove or slot 51, where the free end is formed with a groove 53 to receive the end of a spring 54. The opposite end of this spring is secured to the end of a similar post 56 that is fixed to the loose gear 46. The spring 54 wipes around the hub of the gear 46 and its reaction tends to hold the ends $f$ of the two plates 47 and 49 in contact and when so positioned, the teeth of the gear 46 that enter the same field as the teeth of the gear 44, will be alined and form a wide tooth section extending across the faces of both gears, for a three-tooth dimension. These two gears 44 and 46 form jointly a means of transmitting an intermittent motion to a gear 57 secured to the shaft 58; the gear 57 having the same width of face as the combined width of both gears 44 and 46. The ratio of transmission is such, that while the gears 44 and 46 are making one complete revolution, the gear 57 will also pass through a complete revolution, but during this interval, the gear 57 will be at rest while the gear 44 is rotating through ninety degrees of its full revolution, as follows—

The shaft 43 having a direct and positive connection with the driving shaft 34, rotates constantly in the direction of the arrow $a$. In Fig. 9, the last tooth $b$ of the gear 44 has just passed out of engagement with the adjacent tooth $c$ of the gear 57 and transmitted motion to the said gear has ceased.

The continued rotation of the shaft 43 and gear 44 tends to flex the spring 54, because the gear 46 is held stationary through the engagement of its teeth with the teeth of the gear 57, and the post 52 will swing through the slot 51. The rotation of the gear 44 continues until the positions are assumed as shown at Fig. 10, where the advancing tooth $d$, of the gear 44 is just in contact with the adjacent tooth of the gear 57. The engagement of this one tooth $d$, would be sufficient to give initial movement to the gear 57, but the strain thrown upon this one tooth to set into motion the gear 57 and its subsequent connections, would be ruinous for the tooth. At just this point, where the tooth $d$ of the gear 44 is in contact with the adjacent tooth of the gear 57, the teeth of the loose gear go into action through the contact of the ends $e$ of the two plates 47 and 49. This gear 46 has four teeth in engagement with the gear 57 with three more teeth to follow before the gear 46 passes out of engagement with the gear 57; and hence, the strain of transmitting initial motion to the stationary gear 57, is assumed by the gear 46 until the teeth of the gear 44 have reached a position where a full-tooth-engagement has taken place between the gear 44 and the gear 57. As the rotation of the gear 44 continues from the position of Fig. 10, the time will come when the teeth of the gear 46 will pass out of engagement with the gear 57, when the reaction from the spring 54 will immediately restore the gear 46 to its normal position determined by the abutment of the ends $f$, of the two plates 47 and 49.

To prevent overthrow of the gear 57 through the momentum of its associated connections, a stop pin 59 is secured to the face of the gear and adapted to rotate within the field of a stop arm 60 that is adjustably secured to an arm 61 mounted to swing freely upon a shaft 137 and normally under the control of a spring 63 coiled about the said shaft, with one end engaging the arm and the other end abutting the rod 7. The reaction from the said spring 63, is arrested by the extension 64 striking the under side of the shaft 43. The abutment between the stop pin 59 and the stop arm 60, is coincident with the position of the gears shown at Fig. 9 and the withdrawal of the stop arm 60 from the path of the stop pin 59, begins almost immediately, through the engagement of the roller 65 that is pivoted between the bifurcated ends of an arm 66 secured to the shaft 43 by a set screw 67. The action of this roller 65 is shown diagrammatically in Fig. 7, where the arm 66 in swinging through the quarter revolution of shaft 43 while the gear 57 is inactive, has withdrawn the stop arm 60 from the path of the stop pin 59; and hence the said gear 57 is free to rotate, when the positions of Fig. 10 are reached.

The shaft 58 extends through the side frame 2 and the end is provided with a pinion 68 fixed thereto and adapted to transmit the motion of the shaft 58 to a pair of gears 69 and 70 fixed to the ends of two shafts 71 and 72 respectively. These two shafts have suitable bearings in both side frames and the ends opposite to the gears 69 and 70, are provided with other gears 73 and 74. These two latter gears are in turn in engagement with two gears 75 and 76 secured to the outer ends of two shafts 77 and 78, that have special bearings provided in the form of anti-friction metal boxes 79, that have an up and down adjustment within suitable housings formed in the upper edge of the two side frames 1 and 2. These boxes 79 are provided with a strap 80 that extends across the housing and over the box and secured by cap screws 81. A cap screw 82 may be threaded through the strap to bear against the top face of the box and provided with a lock nut, for purposes presently to appear.

The gear 74 is in train with an intermediate gear 83 that is mounted to rotate freely upon a stationary stud 84, secured to the side frame 1, by the nut 85 on the inside of the frame. The gear 83 drives a gear 86 secured to the end of a shaft 87 that is provided with bearings in both side frames. The gear 86 drives a gear 88 secured to a shaft 89 that is provided with boxes 79, similar to those for the shafts 77 and 78.

Upon the shafts 71, 72, 78, 87 and 89 and between the two side frames, are mounted hollow metal cylinders 90, 91, 92 93 and 94 respectively. Each cylinder comprises a pipe section with heads inserted and the latter formed with suitable hubs that are threaded for set screws 95 to secure them to their respective shafts and these cylinders are the feed rollers for the paper webs. The shaft 77 is provided with a similar cylinder 96, except that it is smaller in diameter and adapted to receive upon its face a series of electroplates 97; the outer diameter of the electroplates when adjusted to the cylinder being approximately the same diameter as the other cylinders.

Upon the upper edge of the two frames 1 and 2, angle brackets 98 are secured by cap screws 99. These two brackets are formed with a series of vertical slots 100, adapted to confine the reduced ends of suitable ink-rollers 101, two of which may bear against the faces of the electroplates and the others being in train to an ink supplying roller 102, rotating within an ink trough 103. The ink roller 101$^a$, may be formed with a groove at each end to receive the hooked end of a spring 101$^b$, the other end being secured to a pin 101$^c$ driven into the side frame. These springs force the two ink rollers that are in contact with the printing faces to bear positively against the type faces. A gear 104 secured to the end of the cylinder 96 transmits motion to pinions 105 provided for the shaft of each ink roller 101, the whole forming a train between the gear 104 and a gear 106 on the shaft 102$^a$ of the ink roll 102.

As shown in Fig. 1, the cylinder 96 has a length to accommodate four electroplates, leaving a gap between and on each end to accommodate suitable clamping devices, not shown. The ink rollers are divided into sections, each section being equivalent to the width of an electroplate. The ink distributing rolls 102 are similarly divided and each section rotates within an individual trough, so that varying colors of ink may be supplied individual troughs and different webs of paper be printed in different colors at the same time. The rollers 102 are formed of pipe sections as shown in Fig. 18, with heads $102^c$ inserted and provided with a hub that separates adjoining rolls and may be pinned to the shaft $102^a$. Suitable straps $102^b$, retain the rolls 102 in position within the troughs and also provide a means for readily removing the rolls for cleaning purposes. The ink trough as a whole, is mounted upon a rod 108 as shown at Fig. 17. This rod passes through both side frames and provides an axis for the troughs, as by rotating the rod slightly, the gap $h$ may be increased or diminished between the rolls 102 and the edge of the trough. As shown in Fig. 1, the trough is divided by partition walls 107.

The cylinder 93, is provided with glue-distributing rolls 109, the width of each roll being slightly less than the width of the paper webs and all are mounted upon a shaft 110. The detail construction is shown in Figs. 15 and 16. These rolls are pipe sections with heads 179 inserted and one head formed with a hub for separating adjoining rolls and provide a means for securing the rolls to the shaft, as with pins. The free ends of the shaft 110 rest within open slots formed in arms 111 that are fixed to the ends of a glue reservoir 112, that consists of a pipe section with openings in the upper surface to register with the position of the rolls 109 and admit the partial entrance of the rolls within the cylinder so that the said roll may come into contact with the glue and carry it from the cylinder 112 to the cylinder 93. The cylinder 112 is provided with an axial tube 115 that is fixed to the two heads 111 and is adapted to rotate upon a heavier pipe 113 that passes through holes in both side frames 1 and 2. Where this pipe projects through the frame 1, the free end is provided with a plug 114; the opposite end of this pipe communicates with a suitable reservoir, not shown. Holes 116, are drilled at intervals through both pipe 113 and tube 115, to allow the glue to pass from the inside of the pipe 113 to the inside of the cylinder 112. When the rolls 109 are positioned as at Fig. 15, contact between the rolls 109 and the cylinder 93, is maintained by springs 117 that are hooked within suitable grooves at each end of the shaft 110; the opposite end of each spring is secured to an eye 118 in the adjacent rod 5. When it is desired to remove the rolls 109 for cleaning purposes, the springs 117 are unhooked from the ends of the shaft 110; the rolls and cylinder 112 are then rotated to the dotted position in Fig. 15; this movement is limited by the screw 180 and the slot 181 in the tube 115. The diameter of the holes 116, is such, that the holes in the tube move out of register with the holes in the pipe 113; the latter holes becoming closed over by the tube 115 and the supply of glue to the cylinder 112 is checked. A plate 182, is adjustably secured to the edge of the opening into the cylinder 112 on the side nearer the cylinder 93; by adjusting this plate toward or away from the rolls 109, the edge thereof acts as a wiper for the rolls and determines the amount of glue that may be carried to the surface of the cylinder 93.

As already described, the plate 9 constitutes a tie plate at the upper front ends of the two side frames 1 and 2, being permanently secured thereto by cap screws 119. Upon this plate a stationary shear blade 120 is fixed by cap screws 121. The plate 10 is similarly secured below the plate 9, by cap screws 122 and upon this latter plate a movable shear blade 123 is held in cutting relation with the blade 120 by three large headed bolts 124. These bolts are threaded into the plate 10 and upon the shouldered portion that passes through the blade 123, a roller 125 is mounted adapted to coöperate with the walls of an elongated slot 126 formed in the said blade, to provide a free, easy movement for the motion of the blade. These slots 126 are pitched slightly out of the vertical, so that the movable blade 123 shall have a slight shearing movement as it moves upward to coöperate with the stationary blade 120. To operate this blade 123, two holes are drilled and tapped through the blade to receive the threaded ends of two studs 127, that are also provided with lock nuts 128 at their free ends outside the blade. These studs project rearwardly from the back face of the blade and upon the shouldered portion, are mounted connections 129. To give clearance to this connection, a larger hole 130 is made through the plate 10. The connection 129, terminates at a threaded end adapted to enter the threaded hole in a square nut section 131, that is cut away on two sides to form a tongue 132 to enter the bifurcated end of a lever arm 133 and secured therein by a pivot pin 134. This connection is also provided with a lock nut 135. The arm 133 forms part of a lever 136 that is secured to a rockshaft 137 that vibrates within suitable bearings in the two side frames and provided with collars 138 to prevent endwise motion of the shaft. The lever 136 terminates at a point just in front of the shaft 43 and the upper end is provided with a hardened plate 139. To co-operate with this plate 139, a roller 140 is mounted upon a pivot pin 141 within the bifurcated end of an arm 142 that is secured to the shaft 43. The movement of the roller 140 vibrates the lever 136, forcing the arm 133 to lift the movable shear blade 123 into cutting relation with the stationary blade 120.

The vertical arm of each bellcrank 29, is provided with a hardened plate 143 and to coöperate with this plate, a roller 144 is mounted upon a pivot pin 145 between the slotted end of an arm 146 that is secured to the rock shaft 147 that has suitable bearings in the two side frames and provided with collars 148 to prevent endwise motion. An arm 149 is adjustably secured to the shaft 147 and has a pivotal connection 150 to a square nut section 151 that receives the threaded end of a connecting rod 152. This rod 152 is offset to pass below the shafts 34 and 40 and the forward end is provided with an elongated slot 153 to take in the shaft 43, and terminates at an ear that supports a roller 154 projecting from the side of the rod and mounted upon a stud. To coöperate with this roller 154, a cam 155 is secured to the shaft 43, and as shown at Fig. 6, the connection 152 is held against lateral motion by being confined between the adjoining face of the cam 155 and the arm 142. Normally, the roller 144 is in the position shown at Fig. 8, or during the interval that the roller 154 is riding upon the concentric portion of the cam 155. When the cam 155 assumes the position shown at Fig. 5, the spring 156 vibrates the shaft 147 and the roller 144 assumes the position shown in this figure, as contacting against the face of the plate 143; the reaction of the spring 156 being checked by the stop lugs 157 immediately under both arms 146 and secured to the tie rod 8.

At the two rear edges of the side frames, brackets 158 are secured by screws 159. These brackets support two rods 160 and 161, each carrying a series of four wooden rollers 162 and 163 respectively. The rollers 163 are flanged to serve as guides for four webs of paper. The rollers 162 are removable as a whole and lie against the rollers 163 between the flanges and are adapted to prevent looseness in the webs intermediate the rollers and the punches and dies. Similar brackets 164 to carry a similar series of rollers are arranged below to control the four webs of paper that constitute the backing-strip of the card. And on the lower edge of the frame, brackets 166 support a series of four single flanged rollers that serve as guides for the webs 165 between the rollers in the brackets 164 and the face of the cylinder 91.

The cardboard webs, which may be indicated as 168, Fig. 4, are furnished in rolls from the paper mills and are drawn from these rolls through the two rollers 162 and 163 over the faces of the dies 22 and under the stripper plate 169; between the cylinders 93 and 94 to the cylinders 91 and 92; thence over the table plate 170 to the cylinder 90 and the electroplates 97; thence across the plate 171 and between the two cutting elements 120 and 123. To secure a positive feed of the cardboard between the cylinders, the screws 82 over each box 79 are turned to exert pressure against the shafts of the several cylinders. The backing strip 165, is furnished in rolls and joins the cardboard on the under side, at the cylinders 91 and 92.

The cardboard and paper webs having been adjusted as described, the main driving shaft 34 in rotating in the direction of the arrow, will draw the connection 32 downward through the action of the associated eccentrics 33; the rotation of the bellcranks 29 being checked by the rollers 144, a downward motion is conveyed to the slide 14 causing the whole series of punches 172 to punch out the cardboard webs and enter their associated dies. At the end of the complete revolution of the shaft 34, the slide will be restored to the full control of the springs 36 and the upward movement of the said slide will be arrested by the stops 173 at each side. During this complete revolution of the shaft 34, the shaft 43 will make a quarter of a full revolution and during this movement of the shaft 43, the cam 155 has rotated from the position of Fig. 5, in the direction of the arrow; the roller 154 engages the concentric portion of its face or "dwell" 174 and no motion is communicated to the connection during the downward movement of the connection 32; at the end of the down movement of the connection 32, the roller 154 leaves the "dwell" 174 and engages the quick-acting face of the cam 155, so that when the shaft has completed the full stroke of the first revolution, the roller 154 has about passed to the larger concentric face of the cam 155; the connection 152 has been drawn forward; the rockshaft 147 vibrated; the spring 156 put under tension and the roller 144 is raised to the position shown at Fig. 8. The next three revolutions of the shaft 34 will simply vibrate the bellcranks 29 to the position shown in this figure. At the end of the first revolution of the shaft 34, the shaft 43 has rotated to bring the gears 44 and 46 into the position shown at Fig. 10 and motion is about to be conveyed to the shaft 58; and during the next three revolutions of the shaft 34, the cylinders 93, 94, 91, 92, 90 and 96 will each make a one-half revolution, which draws the cardboard 168 and the paper web 165 through the machine a single card-length-dimension; joining the two webs together at the cylinders 91 and 92 and printing upon the upper face as the webs pass between the cylinder 90 and the printing faces on the cylinder 96. At the end of the fourth revolution of the shaft 34, the roller 154 drops abruptly from the concentric portion of the cam 155 through the reaction of the spring 156 and the several parts assume positions shown at Fig. 5, and the gears 44 and 46 have assumed the positions shown at Fig. 9.

During the first revolution of the shaft 34, and during the interval the slide 14 is moving down and back, the rollers 140 have vibrated the lever 136 and thrown the shearing elements 123 and 120 into coöperation to cut off the finished card, and been restored to their inactive positions.

During the rotation of the cylinder 93, the rollers 109 rotate therewith through frictional contact with the face thereof and deposit a coating of glue on the cylinder which is transferred to the under face of the cardboard webs as the latter pass between the cylinders 93 and 94. As this glued cardboard passes to the cylinders 91 and 92, it meets the paper web 165 and the two are joined together in passing between the two latter cylinders.

As shown at Figs. 1, 12, 13 and 14, the punchings made in the cardboard webs, form a circular pocket for the reception of the coin, with an integral strap to pass over the face of the coin; the coin being introduced or forced under the strap; and when the coin is so placed, it is held within the pocket by the strap across the face and the backing strip 165 at the rear. It is necessary, then, in applying the glue to the underside of the cardboard, that no glue is applied to this strap that extends across the coin pocket. This very essential feature is provided for, by drilling holes 176 through the face of the cylinder 93. The position of these holes is timed to register with the punched out positions in the cardboard and no glue can be deposited on the tongue or straps across the coin pocket or cavities, or immediately near the edges thereof. At Figs. 12, 13 and 14, the dotted lines around the coin pockets, indicate the field where no glue is applied. And these figures also show in dotted lines, the relative widths of the cardboard and backing strips.

At Fig. 1, the bolster plate 11 is shown adapted to receive seven dies 22, $22^a$, $22^b$, $22^c$, $22^d$, $22^e$, and $22^f$. The slide 14 is provided with a similar number of punches 172. The die 22 is single unit, adapted and positioned to form a single coin pocket at the upper right corner of the card as indicated at Fig. 14. This pocket, which is shown full size, is adapted to the fifty-cent piece; and while the die can be changed to pierce a twenty-five cent pocket, the cardboard web that passes over this die cannot have more than one coin pocket in each card length indicated by the dotted lines 177.

The double form of dies $22^a$ and $22^b$, make a double piercing as indicated at Fig. 13; one piercing on either side of the cutting off position of the web indicated by the dotted line 178, which provides a card length having two twenty-five cent pockets; one at each lower corner. The dies $22^c$ and $22^d$, are similar to those just described for the card shown at Fig. 13. The die arrangement at $22^e$ and $22^f$, offer a different combination, being positioned to perforate the cardboard web on both sides of the cutting off line 178 of Fig. 12 and making provision for a card having a fifty cent pocket at the lower right hand corner and a twenty-five cent pocket at the lower left hand corner. From these several combinations of die arrangement, it will be seen that other combinations are possible, as for instance, one of the double dies $22^a$ or $22^b$ may be removed and only one coin pocket will be formed at either lower corner of the card.

From this description, it will be seen that two paper elements in the form of long continuous webs that may be rolled up into a compact form and eliminate all cutting waste are employed in the construction of the coin card; that the operations required to convert these two paper elements into a finished coin-card-product, are all embodied in a single machine where one operation follows another automatically in proper sequence; that during the interval the punching and cutting off elements are active, the paper feeding elements are inactive; that during the interval the paper feeding and printing elements are active, the punching and cutting off elements are at rest; that for every full revolution of the shaft 43, ninety parts are employed to punch and cut off the finished webs into card sizes and that the remaining two hundred and seventy parts are employed to feed the cardboard a card dimension and print such matter as may be desired upon its face; that the cardboard webs have individual printing elements; that these printing elements have individual inking means; and that the glue depositing element 93 transfers a mutilated or broken coating to the cardboard webs so that the backing strip of paper may not be uniformly glued to the entire face of the webs.

I claim—

1. In a machine for making coin cards the combination with two side frames of the machine, a slide arranged for vertical movement between the frames and carrying a punch, a die bed fixed between the frames and provided with a die to coöperate with the punch, a pair of horizontally arranged paper feed rollers, adapted to feed two continuous webs of paper through the machine, a pair of glue-distributing rollers adapted to apply a coating of glue to the face of one web, cutting off elements adapted to sever both webs in uniform lengths, a main driving shaft operably connected to said slide and one of the cutting off elements and having a continuous rotary movement, and a mutilated gear transmission intermediate the said shaft and the paper feeding rollers adapted to arrest the motion of the two webs during the interval the punching and cutting off elements are active.

2. In a machine for making coin cards the combination with two side frames of the machine, of a slide arranged for vertical movement between the frames and carrying a punch; a die bed fixed between the frames and provided with a die to coöperate with the punch; a pair of draw rollers adapted to feed two continuous webs of paper through the machine; glue-distributing rollers adapted to coat one face of one web with glue; a main driving shaft operably connected to said slide and having a continuous rotary movement; and means for arresting the movement of the feed rollers during the interval the punching elements are active.

3. In a machine for making coin cards the combination with two side frames of the machine, of a slide arranged for vertical movement between the two frames and carrying a punch; a die bed fixed between the two frames and provided with a die to coöperate with the punch; a pair of draw rollers arranged to feed two continuous webs of paper through the machine; glue distributing rollers adapted to coat one face of one web with glue; printing elements arranged to transfer type impressions to the adjacent face of one web; a main driving shaft operably connected to said slide and having a continuous rotary movement; and means intermediate the said shaft and the paper feeding rollers for arresting the movement of the two webs during the interval the punching element is active.

4. In a machine for making coin cards, the combination with the two side frames of the machine, of a slide arranged for vertical movement between the frames and provided with a punch; a die bed fixed between the two frames and provided with a die; paper feeding means to draw two continuous webs of paper through the machine, one of the webs passing between the punching elements; glue distributing elements arranged to coat one face of one web with glue; printing elements arranged to transfer type impressions to the adjacent face of one web; cutting off devices to sever both webs; a main driving shaft operably connected to said slide and to the cutting off device and having a continuous rotary movement; and means intermediate the said shaft and the paper feeding rollers adapted to stop the movement of both webs during the interval the punching and cutting off elements are active.

5. In a machine for making coin cards from two continuous webs of paper, the combination with the two side frames of the machine; of a slide arranged for vertical movement between the two frames and provided with a punch; a die bed fixed between the two frames and provided with a die to coöperate with the punch; feed rollers adapted to draw one web of paper through the machine under the punch and join this punched web to the other plain web; glue distributing rollers adapted to coat one face of one web with glue before the two webs are joined together by the feed rollers; means associated with the gluing roller to prevent the gluing of the two webs adjacent the punched out position in one web; a main driving shaft operably connected to said slide and having a continuous rotary movement; and a mutilated gear transmission intermediate the said shaft and the feed rollers to arrest the movement of both webs during the interval one web is being punched out.

6. In a machine for making coin cards from two continuous webs of paper, the combination with the two side frames of the machine; of a slide arranged between the two frames carrying a punch; a die bed fixed between the two frames and provided with a die to coöperate with the punch; feed rollers adapted to draw one web under the punch and join this web to the other web; glue distributing means arranged to coat one face of one web with glue without coating the section adjacent the punched out portion; a main driving shaft having a continuous rotary movement and connected to the slide; and means intermediate the said shaft and said feed rollers whereby both webs are held stationary during the punching out operation of one web.

7. In a machine for making coin cards from two continuous webs of paper, the combination with the side frames of the machine; of a slide arranged between the frames and provided with a punch; a die bed fixed between the frames and provided with a die to coöperate with the punch; draw rollers adapted to draw both webs through the machine, drawing one web under the punch and the other web through without being punched; glue distributing rollers to coat one face of one web with glue without coating the section adjacent the punched out portion; cutting off elements to sever both webs; a main driving shaft having a continuous rotary movement and connected to the feed rollers, the slide and the cutting off elements; said connections comprising means whereby the webs are both held stationary during the interval one web is being punched and both webs are severed by the cutters.

8. In a machine for making coin cards from two continuous webs of paper, the combination with the side frames of the machine; of a slide arranged between the frames and provided with a punch; a stationay die to coöperate with the said punch; feed rollers adapted to draw one web under the punch and the other web through the machine without being punched; glue distributing rollers to coat one face of one web with glue without coating the section adjacent the punched out portion in the web; printing elements to transfer type impressions to the adjacent face of the punched out web; cutting off elements to sever the punched, printed and glued card in uniform lengths; and a main driving shaft operably connected to said slide and one of the cutting off elements and having a continuous rotary movement with intermediate connection whereby the feed rollers are inactive during the interval the punch and cutters are operative.

9. In a machine for making coin cards the combination with the two side frames of the machine; a slide arranged for vertical movement within the two frames and provided with a punch; a die bed fixed between the frames and provided with a die to coöperate with the punch; a main driving shaft having a continuous rotary movement; eccentrics mounted on said shaft; straps connected to the eccentrics; bellcranks pivotally mounted to the lower ends of the slide and connected to the straps; a spring-pressed rock-shaft 147; roll carrying arms 146 adapted to coact with the bellcranks; a pull-rod 152 connected to the rock-shaft; a shaft 43 positively driven by the main driving shaft and a cam on said shaft 43 adapted to vibrate the rock-shaft 147 and so control the vibratory movements of the bellcranks of the slide that the said slide and punch will move down and up once to every four revolutions of the main driving shaft.

10. In a machine for making coin cards the combination with the two side frames of the machine; a punch carrying slide arranged for vertical movement within the frames; a die carrying bed fixed between the two frames; feed rollers adapted to draw two continuous webs of paper through the machine; a main driving shaft having a continuous rotary movement; a shaft 43 positively geared to the main driving shaft; a mutilated gear fixed to the said shaft 43; a second mutilated gear mounted free upon said shaft; stop members on each gear adapted to coöperate and limit the rotation of the loose gear in two directions; a recoil spring connected to both gears to hold the stop members in contact in one direction; a gear 68 adapted to be driven intermittently by both mutilated gears; and a shaft 58 that is positively geared to the feed rollers.

11. In a machine for making coin cards the combination with the two side frames of the machine; a punch carrying slide arranged for vertical movement within the frames; a die carrying bed fixed between the two frames; feed rollers adapted to draw continuous webs of paper through the machine; a main driving shaft having a continuous rotary movement; eccentrics mounted on said shaft; straps connecting the eccentrics to the slide; means for vibrating the slide once in every four revolutions of the main driving shaft; shaft 43 positively geared to the main driving shaft; a pair of mutilated gears adapted to give a stop movement to the feed rollers, mounted on said shaft; and means mounted on said shaft 43 for operating the cutting off elements that sever the webs, simultaneously with the movement of the slide.

HERBERT H. STEELE.

Witnesses:
F. E. STEELE,
HARRY R. ZORN.